United States Patent [19]

Douillard

[11] Patent Number: 4,720,186
[45] Date of Patent: Jan. 19, 1988

[54] FOLDING EYEGLASSES

[76] Inventor: Roger Douillard, 66 Columbus Ave., Valhalla, N.Y. 10595

[21] Appl. No.: 802,387

[22] Filed: Nov. 27, 1985

[51] Int. Cl.⁴ .......................... G02C 5/08; G02C 5/16; G02C 1/00

[52] U.S. Cl. ...................................... 351/63; 351/158; 351/114

[58] Field of Search ........................... 351/63, 114, 158

[56] References Cited

U.S. PATENT DOCUMENTS 3,395,964  8/1968  Neider .................................... 351/63

FOREIGN PATENT DOCUMENTS 542876  1/1942  United Kingdom ................. 351/114

Primary Examiner—Rodney B. Bovernick
Attorney, Agent, or Firm—Richard A. Joel

[57] ABSTRACT

A pair of folding eyeglasses and watch carrying case comprises a pair of frame members hinged together at an intermediate bridge point and slidable within a pair of upper and lower sleeves which contain a lens mounted therebetween. A temple bar having an intermediate spring portion extends from the other end of each upper sleeve and terminates in an ear piece. The eyeglasses may be readily folded with the upper sleeves in a juxtaposed position by merely unlocking the hinge and rotating the lenses 90 degrees. The eyeglasses are stored in a carrying case beneath a pivotal watch movement having apertures at opposing sides through which the temple bars protrude at one end and the hinge protrudes at the other end. A strap is fixedly mounted to the case at one end and includes intermediate locking means for the temple bars and a removable coupling at the other end for connection to a mating coupling on the watch case.

7 Claims, 7 Drawing Figures

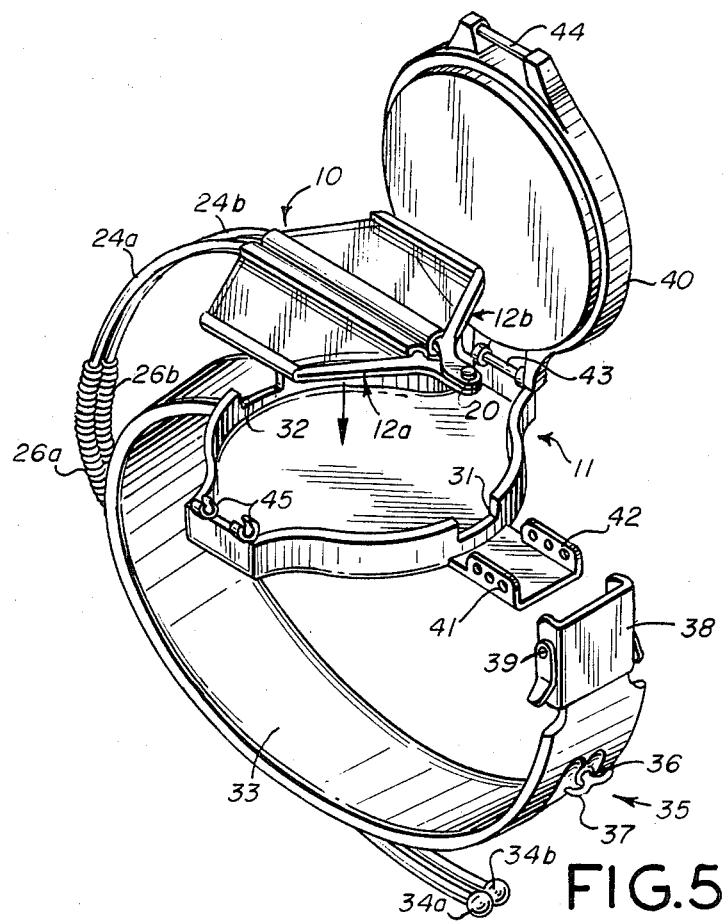

FOLDING EYEGLASSES

BACKGROUND OF THE INVENTION

This invention relates to eyeglasses and particularly to folding reading glasses which may be collapsed into an extremely compact package which is capable of being carried in a watch compartment or merely carried in one's pocket as a spare. The problem with reading glasses from a wearer's standpoint, is the tending to lose or forget the glasses.

The present invention provides a convenient method and unique assembly which facilitates carrying eyeglasses at all times with the reader either as a spare or as an original pair. Due to the convenient design of the eyeglasses and the watch carrying case, an individual can always carry a pair of glasses and eliminate the possibility of being caught without suitable vision aids.

I have proposed various embodiments for collapsible eyeglasses in my co-pending applications U.S. Ser. No. 671,757 filed Nov. 15, 1984 and U.S. Ser. No. 718,750 filed Apr. 1, 1985 now both abandoned. This application represents an improvement over the embodiments in my earlier applications.

U.S. Pat. No. 1,882,462 to Johnson discloses foldable spectacles which include hinges as part of the overall design. U.S. Pat. No. 2,814,968 to Nixon discloses a similar arrangement.

Windgate U.S. Pat. No. 1,936,319 discloses a specific folding hinge arrangement while Chartrese U.S. Pat. No. 3,395,964 discloses a biased nose bridge and temple pieces. The Chartrese glasses fold back into a compartment arrangement.

The present invention, however, is an improvement thereover and discloses a folding eyeglass arrangement which readily folds into a compact package for storage in a wrist carrying case located beneath a pivotal watch movement. The eyeglasses include a hinge joining the frame members together in the middle which may be readily locked and unlocked from a wearing position. The frame members comprise integral nose pads and are adjustable within lens carrying sleeves. The eyeglasses are mounted within the case and include strap-locking means for the temple bars. The simplicity, low cost, and convenience of the design are distinct advantages.

SUMMARY OF THE INVENTION

The present invention relates to eyeglasses and particularly to a new type of folding eyeglasses and a cooperating storage compartment therefor.

The eyeglasses comprise a pair of frame members hinged together at an intermediate bridge point and slidable within a pair of upper and lower sleeves which contain a lens mounted therebetween. The frame members each include upper and lower parallel portions and a downwardly extending connecting portion which serves as a nose pad. A hinge portion extends outwardly from each upper frame members and includes a mating key and aperture arrangement for rapid assembly and disassembly. The temple bars are curved flexible members having an intermediate spring portion and a downwardly extending earpiece at the far end thereof.

The carrying case comprises a compartment mounted beneath a pivotal watch movement and including apertures in the opposite side walls where a strap is mounted. When the eyeglasses are mounted within the compartment, the hinge extends through one aperture and the temple bars extend through the other aperture and wrap around the strap.

BRIEF DESCRIPTION OF THE DRAWINGS

Other objects and advantages of the present invention will be more clearly understood when viewed in conjunction with the accompanying drawings wherein:

FIG. 5 is a perspective view of the folding eyeglasses and carrying case with a pivotal watch movement;

FIG. 6 is a top view of the watch carrying case having the eyeglasses mounted therein; and, FIG. 7 is a cross-sectional view taken along the line 7—7 of FIG. 6.

Figures 1, 2, 3, 4:
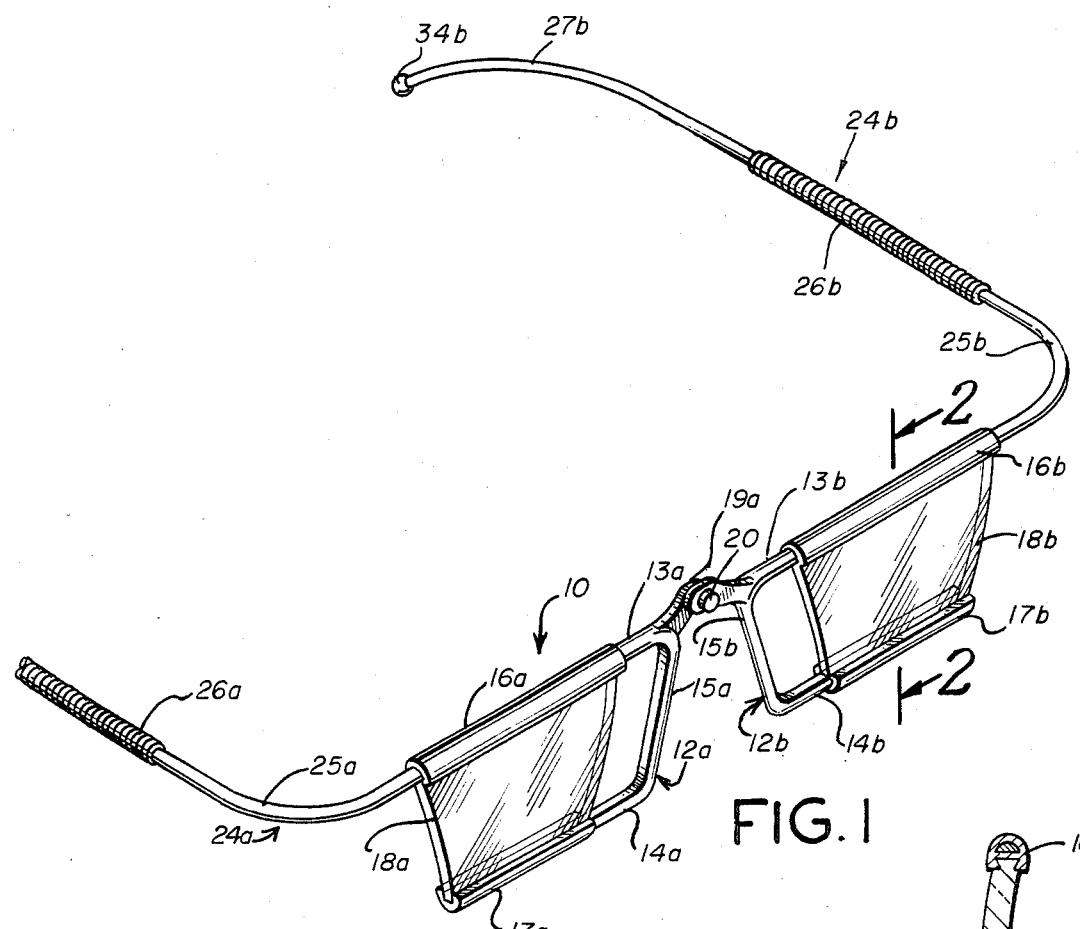
FIG. 1 shows a perspective view of the new and improved eyeglasses comprising the invention.
FIG. 2 shows a cross-sectional view along the line 2—2 of FIG. 1.
FIG. 3 is an enlarged perspective view of the eyeglass hinge.
FIG. 4 is a front view of the eyeglasses with the folding operation illustrated in phantom.

A more specific object of this invention is to provide a new and improved pair of folding eyeglasses wherein the frame portion and temple bars are readily adjustable and the carrying case includes a cooperating adjustable strap to which the temple bars are affixed and a pivotally mounted watch movement which comprises the compartment cover over the eyeglasses.

The strap includes locking means to hold the temple bar in place and an adjustable coupling which connects to a mating coupling extending outwardly from the watch compartment.

In operation, the frame members are pushed together forcing the upper and lower portions within corresponding sleeves and simultaneously disengaging the hinges to permit rotation of the frame members. After rotation, the eyeglasses are placed within the carrying compartment and the temple bars locked in place on the straps. The watch movement is pivoted downwardly over the glasses and locked in position.

Accordingly, the object of this invention is to provide a new type of folding eyeglasses and a watch storage compartment therefor.

Another object of this invention is to provide a new and improved pair of folding eyeglasses which is extremely simple and compact.

A further object of this invention is to provide a new and improved pair of folding eyeglasses having integrated nose pads and an extremely simple intermediate hinge locking arrangement.

DETAILED DESCRIPTION OF THE INVENTION

Referring now to the drawings, the invention comprises a pair of folding eyeglasses 10 as shown in FIG. 1 which may be folded and carried in a watch compartment 11, best shown in FIG. 5. The eyeglasses 10 include frame members 12a and 12b having upper portions 13a and 13b respectively joined to lower portions 14a and 14b by connecting portions, 15a and 15b which function as nose pads. The upper and lower frame portions 13a and 14a are adjustably slidable within sleeves 16a and 17a respectively. The same applies to portions 13b and 14b which slide within sleeves 16b and 17b. Lens 18a is mounted between sleeves 16a and 17a while lens 18b is mounted between sleeve 16b and 17b.

The frame member 12a includes a member 19a projecting outwardly from the upper portion 13a. Member 19a includes a pin 20 with a flatened shaft 23 extending at a right angle to the surface and terminating in an enlarged head 21. The head 21 fits into a key shaped aperture 22 in mating member 19b and the shaft 23 is then slid into the base 29 of the aperture 22 locking the frame members 12a and 12b together. Apart from the pin 20 and aperture 22 coupling, the frame members 12a and 12b contain the same elements arranged in reverse order.

The temple bars 24a and 24b each include a curved metal portion 25a and 25b extending outwardly from the lens sleeves 16a and 16b, an intermediate spring portion 26a and 26b and an end ear piece portion 27a and 27b which extends downwardly.

FIG. 4 shows graphically how the eyeglasses 10 are folded. The frames 12a and 12b are pushed together moving the upper and lower portions 13a and 14a within corresponding sleeves 16a and 17a. The same movement occurs with frame member 12b and its elements. Pin 20 moves into the enlarged portion 28 of the aperture 22 where it is free to rotate; see FIG. 3. The frame members 12a and 12b are then moved upwardly so that the sleeves 16a and 16b are in contact. The eyeglasses 10 are now ready for storage in the case or compartment 11 as illustrated in FIG. 5.

FIG. 5 illustrates a compartment 11 having slots 31 and 32 in the walls thereof at opposite sides. The hinge arrangement of members 19a and 19b with the mating pin 20 and aperture 22 arrangement extends outwardly from slot 31. The temple bars 24a and 24b extend outwardly from slot 32 and wrap around the strap 33. The enlarged ends 34a and 34b ear piece portions 27a and 27b snap into a flexible locking member 35 having an upwardly extending portion 36 terminating in an upper member 37 with downwardly extending portions on either side configured to the ear piece portions 27a and 27b and hold them in place.

An adjustable coupling 38 is mounted on one end of the strap 33 with pins 39 to engage apertures 41 in the mating coupling 42 which is fixedly mounted to the case 11. A typical watch movement 40 is mounted on compartment bar 43 and is pivotal thereabout. The other end of the movement 40 includes a bar 44 which engages flexible locking members 45 to hold the movement 40 in place.

To remove the glasses 10, the movement 40 is pried loose from members 45 and pivoted backward about bar 43. The glasses are removed from the case 11 and the temple bars from locking member 35. The frame members 12a and 12b are pulled outwardly and the temple bars 24a and 24b are extended outwardly preparing the glasses 10 for use simply and expeditiously.

It is understood that the above-described arrangements are merely illustrative examples of the application. Numerous other arrangements may be readily devised by those skilled in the art which will embody the principles of the invention and fall within the spirit and scope thereof.

I claim:

1. A pair of folding eyeglasses comprising:
a first and a second frame member each having a separate hollow sleeve along the upper portion and the lower portion thereof and a lens mounted between said sleeves, said frame further including a pair of adjustable nose pads each having upper and lower projecting members slidable within the corresponding hollow sleeves, a downwardly extending portion therebetween and an outwardly extending bridge portion and means on said portion coupling the pads together,
a first and a second flexible temple bar extending outwardly from a corresponding frame member, said temple bars having resilient means at an intermediate point and terminating in a downwardly extending ear piece portion.

2. A pair of folding eyeglasses in accordance with claim 1 wherein:
the means coupling the pads together comprises an outwardly extending pin having an enlarged head on one extending bridge portion and a key shaped slot on the other extending bridge portion for engaging and locking said members together.

3. A pair of folding eyeglasses in accordance with claim 1 wherein:
the sleeve members each comprise a curved outer surface and a semi-circular aperture extending therethrough and the projecting nose pad members have a mating configuration engaging said apertures.

4. A pair of folding eyeglasses in accordance with claim 1 further including:
a watch case having a watch movement pivotally mounted on the upper surface thereof and having a hollow compartment beneath said watch movement, said compartment having apertures in the opposite portions of the walls thereof and coupling means extending outwardly therefrom,
a watch band having an adjustable means at one end for mounting to the coupling means on the hollow compartment and being fixedly mounted to the watch case at the outer end, said watch band having projecting locking means extending outwardly therefrom towards one end thereof,
whereby the eyeglasses may be folded and positioned within the watch compartment with the nose pad projecting members extending through one aperture and the temple bars extending outwardly through the other aperture and being wrapped around the outer portion of the watch band and held in position by the locking means on the watch band.

5. A pair of folding eyeglasses in accordance with claim 4 wherein:
the locking means comprises a flexible member having an upwardly extending portion and an outer downwardly curved portion which locks the temple bars in position.

6. A pair of folding eyeglasses in accordance with claim 1 wherein:
the frame members may be rotated 90° about the coupling means into a juxtaposed position with the frame members in engagement.

7. A pair of folding eyeglasses in accordance with claim 4 wherein:
the adjustable means on the watch band comprises a channel shaped member with inwardly protruding pins and the mating means on the watch movement comprises a reverse channel shaped member having spaced apertures to be engaged by the pins.

* * * * *